US006657704B2

(12) United States Patent
Shirai et al.

(10) Patent No.: US 6,657,704 B2
(45) Date of Patent: Dec. 2, 2003

(54) DISTANCE MEASUREMENT APPARATUS

(75) Inventors: Noriaki Shirai, Kariya (JP); Katsuhiro Morikawa, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/157,230

(22) Filed: May 30, 2002

(65) Prior Publication Data

US 2002/0186362 A1 Dec. 12, 2002

(30) Foreign Application Priority Data

Jun. 11, 2001 (JP) .......................... 2001-175477

(51) Int. Cl.[7] .............................. G01C 3/08; G01S 13/08
(52) U.S. Cl. ...................... 356/4.01; 342/135; 342/145; 356/5.01; 356/5.1
(58) Field of Search ...................... 356/4.01, 5.01–5.15; 342/135, 145

(56) References Cited

U.S. PATENT DOCUMENTS

| 4,028,699 | A | * | 6/1977 | Stevens |
| 4,734,587 | A | * | 3/1988 | Schwarte |
| 5,329,467 | A | * | 7/1994 | Nagamune et al. |
| 5,337,052 | A | * | 8/1994 | Lohrmann et al. |
| 5,621,514 | A | * | 4/1997 | Paranto et al. |
| 5,757,848 | A | * | 5/1998 | Hogberg |
| 6,218,982 | B1 | | 4/2001 | Shirai et al. |

FOREIGN PATENT DOCUMENTS

| JP | 4-363687 | 12/1992 |
| JP | 5-264724 | 10/1993 |
| JP | 2000-121726 | 4/2000 |
| JP | 2000-338243 | 12/2000 |

* cited by examiner

Primary Examiner—Stephen C. Buczinski
(74) Attorney, Agent, or Firm—Posz & Bethards, PLC

(57) ABSTRACT

A forward electromagnetic wave is generated in accordance with a succession of pseudo random noise code signals. An echo electromagnetic wave caused by reflection of the forward electromagnetic wave at an object is converted into a received signal. Direct-current and low-frequency components are removed from the received signal to generate a filtering-resultant signal. The filtering-resultant signal is compared with a preset decision reference voltage to generate a binary signal. The binary signal is sampled into received data. Calculation is made as to a correlation between the received data and the pseudo random noise code signal. The distance to the object is computed on the basis of the calculated correlation. The pseudo random noise code signal is repetitively generated to produce a succession of the pseudo random noise code signals during a surplus time covering a stabilization time taken by the received signal to stabilize in direct-current voltage level.

8 Claims, 5 Drawing Sheets

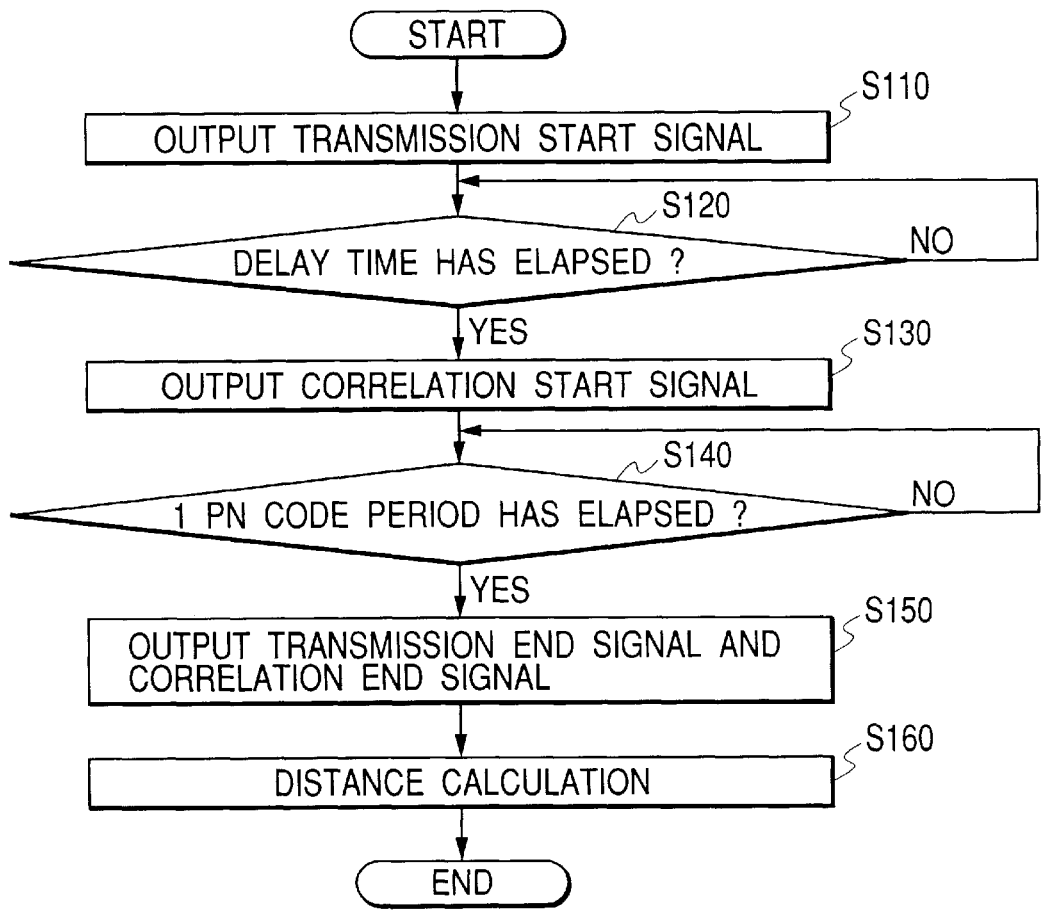
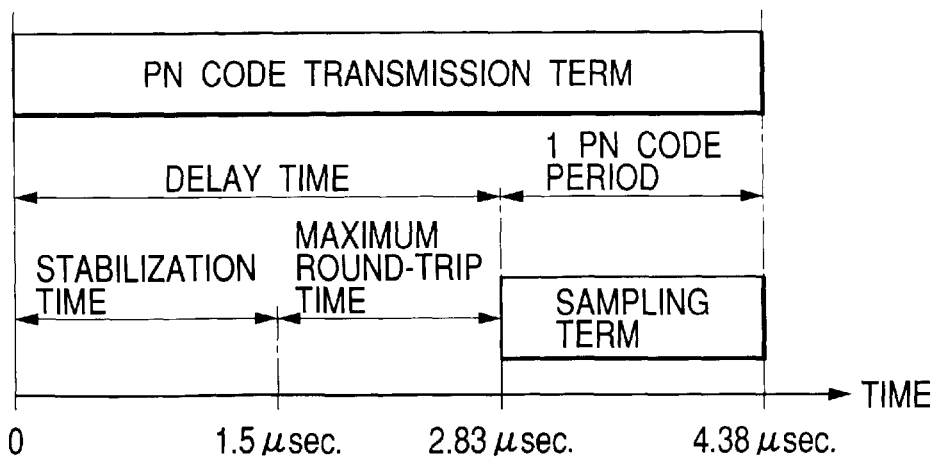

DISTANCE MEASUREMENT APPARATUS

BACKGROUND OF THE INVENTION

1. Field of the Invention

This invention relates to a distance measurement apparatus using an electromagnetic wave modulated in accordance with a pseudo random noise code.

2. Description of the Related Art

A prior-art distance measurement apparatus of a spread spectrum type measures the distance between the apparatus and a target object by using an electromagnetic wave modulated in accordance with a pseudo random noise code (a PN code). Specifically, a beam of an electromagnetic wave whose amplitude is modulated in accordance with a PN code of a predetermined bit length (a predetermined chip length) is emitted in a forward direction with respect to the body of the apparatus. A moment of the transmission of the PN code with the electromagnetic wave is memorized. The prior-art apparatus receives an echo beam caused by reflection of the forward electromagnetic-wave beam at a target object. The received echo beam is converted into a corresponding electric signal. The echo-beam-corresponding electric signal is binarized into a bi-level echo electric signal. Calculation is made about the value of the correlation between the bi-level echo electric signal and the PN code used for the modulation of the transmitted electromagnetic wave. A moment at which the calculated correlation value peaks is detected as a moment of the reception of the PN code contained in the echo beam. The prior-art apparatus calculates the distance between the apparatus and the target object from the time interval between the moment of the transmission of the PN code and the moment of the reception thereof.

An example of the electromagnetic wave is light emitted from a laser diode. In this case, the prior-art apparatus uses a photodiode or a phototransistor as a photodetector (a photoelectric conversion device) for converting a received echo beam into a corresponding electric signal. The photodetector outputs the electric signal. The voltage of the electric signal outputted from the photodetector varies only in a positive side or a negative side of a circuit reference potential generally equal to a circuit ground potential. In the prior-art apparatus, binarizing the output signal of the photodetector is implemented by comparing the voltage of the output signal of the photodetector with a threshold voltage (a decision reference voltage). To accurately binarize the output signal of the photodetector, it is necessary to properly set the threshold voltage with respect to a range in which the voltage of the output signal of the photodetector varies. Inaccurately binarizing the output signal of the photodetector reduces the accuracy of the calculated distance to a target object.

Japanese patent application publication number 5-264724 discloses a distance measurement apparatus using a radio SS (spread spectrum) signal. The apparatus in Japanese application 5-264724 is divided into a transmitter and a receiver. The transmitter includes a PN generator, a carrier generator, a multiplier, and an RF (radio frequency) portion. The PN generator outputs a PN code to the multiplier. The carrier generator outputs a carrier to the multiplier. The multiplier executes multiplication between the PN code and the carrier, thereby subjecting the carrier with phase modulation responsive to the PN code. The multiplier outputs the modulation-resultant signal to the RF portion. The RF portion converts the output signal of the multiplier into a radio SS signal. The RF portion feeds the radio SS signal to a transmission antenna. The transmission antenna radiates the radio SS signal as a forward signal. The receiver includes an RF portion, a correlator, a detection and wave-shaping portion, a time calculator, and a distance calculator. The PN generator in the transmitter outputs a reference bit signal in the PN code to the time calculator, thereby starting the time calculator counting pulses of a clock signal. A reception antenna receives an echo radio SS signal. The received echo radio SS signal is fed from the reception antenna to the receiver RF portion. The receiver RF portion derives an echo PN code from the received echo radio SS signal. The receiver RF portion outputs the echo PN code to the correlator. The correlator calculates the correlation between the echo PN code and a reference PN code which is the same as the PN code outputted from the PN generator in the transmitter. The correlator generates an autocorrelation waveform signal in response to the calculated correlation. The autocorrelation waveform signal has an amplitude which is maximized when the echo PN code comes into agreement with the reference PN code. The correlator outputs the autocorrelation waveform signal to the detection and wave-shaping portion. The detection and wave-shaping portion subjects the autocorrelation waveform signal to a detection process. The detection and wave-shaping portion outputs the detection-process-resultant signal to the time calculator. The time calculator suspends counting pulses of the clock signal in response to the output signal of the detection and wave-shaping portion. Specifically, the time calculator suspends counting when the echo PN code comes into agreement with the reference PN code. The number of pulses counted by the time calculator indicates the time interval from the transmission of the PN code to the reception of the PN code. The time calculator informs the distance calculator of the time interval. The distance calculator computes, from the time interval, the distance to a measured object reflecting the forward radio SS signal and causing the echo radio SS signal.

Japanese patent application publication number P2000-338243A discloses a coherent laser radar apparatus including a CW laser device and a first optical coupler. The CW laser device outputs a source laser beam to the first optical coupler. The first optical coupler divides the source laser beam into a first sub light beam and a second sub light beam. The first sub light beam propagates from the first optical coupler to an optical modulator. The optical modulator modulates the first sub light beam in accordance with a pseudo random signal (a PN code signal) outputted from a PN-code generator. The modulation-resultant light beam propagates from the optical modulator to an optical antenna before being emitted from the optical antenna as a forward light beam. The forward light beam reaches a target, being scattered and reflected thereby and forming an echo light beam. The echo light beam reaches the antenna. The echo light beam travels from the antenna to a second optical coupler. The second sub light beam propagates from the first optical coupler to a frequency shifter. The frequency shifter changes the frequency of the second sub light beam to generate a local light beam. The local light beam propagates from the frequency shifter to the second optical coupler. The second optical coupler mixes the echo light beam and the local light beam. The second optical coupler outputs the mixing-resultant light beam to an optical detector. The optical detector subjects the mixing-resultant light beam to optical heterodyne detection, thereby generating a beat signal between the echo light beam and the local light beam. The optical detector outputs the beat signal to a correlator. A variable delay device receive the pseudo random signal from the PN-code generator. The variable delay device defers the pseudo random signal by a variable time to generate a delayed pseudo random signal. The variable delay device outputs the delayed pseudo random signal to the correlator. The correlator calculates the correlation between the beat signal and the delayed pseudo random signal. The correlator outputs a correlation-representing signal to a signal processor. The PN-code generator feeds the signal processor with information about the pseudo random signal. The variable delay device informs the signal processor of the signal delay time provided thereby. The signal processor analyzes the strength and frequency of the correlation-resultant signal in response to the information about the pseudo random signal and the signal delay time, thereby detecting the target and the Doppler frequency. The PN-code generator changes the output pseudo random signal among a plurality of different pseudo random bit sequences.

U.S. Pat. No. 6,218,982 B1 corresponding to Japanese patent application publication number P2000-121726A discloses a distance measurement apparatus in which a pseudo random noise code is generated synchronously with a reference clock signal. A first forward electromagnetic wave is transmitted in response to the pseudo random noise code. A first echo wave is received which is caused by reflection of the first forward electromagnetic wave at an object. The received first echo wave is converted into a binary signal. A value of a correlation between the binary signal and the pseudo random noise code is repetitively calculated at a predetermined period having a synchronous relation with the reference clock signal. A time interval taken by the first forward electromagnetic wave and the first echo wave to travel to and from the object is measured in response to a timing at which the calculated correlation value peaks. Then, a second forward electromagnetic wave is transmitted in response to a transmitted pulse signal. A second echo wave related to the second forward electromagnetic wave is received. The received second echo wave is converted into a received pulse signal. A delay circuit defers the transmitted pulse signal by a delay time corresponding to the measured time interval to generate a delayed transmitted pulse signal. A phase difference between the received pulse signal and the delayed transmitted pulse signal is measured at a resolution higher than a resolution corresponding to the predetermined period of the correlation-value calculation. A distance to the object is calculated on the basis of the measured time interval and the measured phase difference.

Japanese patent application publication number 4-363687 discloses a distance measurement apparatus including a carrier generator and a PN-code generator. The carrier generator outputs a carrier to a modulator. The PN-code generator outputs a PN code to the modulator. The modulator modulates the carrier in accordance with the PN code to generate a modulation-resultant baseband SS signal. The modulator outputs the baseband SS signal to an up converter. The up converter changes the baseband SS signal into a corresponding RF SS signal. The up converter feeds the RF SS signal to a transmission antenna. The transmission antenna radiates the RF SS signal as a forward signal. The forward signal is reflected by an object before returning as an echo signal. A reception antenna receives an echo RF SS signal. The received echo RF SS signal is fed from the reception antenna to a down converter. The down converter changes the echo RF SS signal into a corresponding echo baseband SS signal. The down converter outputs the echo baseband SS signal to a demodulator. A variable delay device receives the PN code from the PN-code generator. The variable delay device defers the PN code by a time which increases in accordance with the lapse of time. The variable delay device outputs the delay-resultant PN code to the demodulator. The demodulator implements demodulation responsive to the echo baseband SS signal and the delay-resultant PN code to detect the correlation therebetween. A signal processor detects when the correlation peaks. Information about the signal delay time currently provided by the variable delay device is fed to the signal processor. The signal processor detects the signal delay time which corresponds to the timing at which the correlation peaks. The signal processor computes the distance to the reflecting object on the basis of the detected signal delay time.

SUMMARY OF THE INVENTION

It is an object of this invention to provide an accurate distance measurement apparatus using an electromagnetic wave modulated in accordance with a pseudo random noise code.

A first aspect of this invention provides a distance measurement apparatus comprising code generating means for repetitively generating a pseudo random noise code signal of a predetermined chip length in synchronism with a clock signal of a fixed period to generate a succession of the pseudo random noise code signals; transmitting means for generating a distance-measuring electromagnetic wave in accordance with the succession of the pseudo random noise code signals generated by the code generating means, and for transmitting the generated electromagnetic wave toward an object as a forward electromagnetic wave; receiving means for receiving an echo electromagnetic wave caused by reflection of the forward electromagnetic wave at the object, and for converting the received echo electromagnetic wave into a corresponding received signal which varies only in one of (1) a positive side and (2) a negative side of a reference potential; signal processing means for removing components from the received signal generated by the receiving means to generate a processing-resultant signal, the removed components having frequencies lower than frequencies of components of the pseudo random noise code signal generated by the code generating means; binarizing means for comparing the processing-resultant signal generated by the signal processing means with a preset decision reference voltage to convert the filtering-resultant signal into a corresponding binary signal; correlation value calculating means for sampling the binary signal generated by the binarizing means into received data in synchronism with the clock signal, and for calculating a value of a correlation between the received data and the pseudo random noise code signal generated by the code generating means; distance calculating means for calculating a time interval taken by the electromagnetic wave to travel a distance to the object in forward and backward directions on the basis of the correlation value calculated by the correlation value calculating means, and for computing the distance to the object from the calculated time interval; and transmission start timing controlling means for, before start of the sampling by the correlation value calculating means, causing the code generating means to repetitively generate the pseudo random noise code signal during a surplus time corresponding to at least a stabilization time taken by the received signal to stabilize in direct-current voltage level after start of reception of the echo electromagnetic wave by the receiving means, and thereby for causing a timing of start of transmission of the forward electromagnetic wave by the transmitting means to be earlier than a timing of start of calculation of the correlation value by the correlation value calculating means.

A second aspect of this invention is based on the first aspect thereof, and provides a distance measurement apparatus wherein the transmission start timing controlling means comprises means for, before start of the sampling by the correlation value calculating means, causing the code generating means to repetitively generate the pseudo random noise code signal during the surplus time equal to the stabilization time plus a maximum round-trip time taken by electromagnetic wave to travel a maximum measurable distance in forward and backward directions.

A third aspect of this invention is based on the first aspect thereof, and provides a distance measurement apparatus wherein the correlation value calculating means comprises (1) means for periodically sampling the binary signal to generate received data sampled bits whose number corresponds to the predetermined chip length, and (2) means for calculating the value of the correlation between the received data sampled bits and the bits of the pseudo random noise code signal while shifting the received data sampled bits relative to the pseudo random noise code on a 1-bit by 1-bit basis, and wherein the distance calculating means comprises means for calculating the time interval taken by the electromagnetic wave to travel the distance to the object in the forward and backward directions on the basis of a phase difference between the received data sampled bits and the bits of the pseudo random noise code signal which corresponds to a moment when the correlation value calculated by the correlation value calculating means peaks.

A fourth aspect of this invention is based on the first aspect thereof, and provides a distance measurement apparatus wherein the transmitting means comprises (1) a light emitting element for generating light as the distance-measuring electromagnetic wave and (2) a drive circuit for driving the light emitting element in accordance with the pseudo random noise code signal, and the receiving means comprises a light receiving element for receiving the echo electromagnetic wave caused by reflection of the forward electromagnetic wave at the object.

A fifth aspect of this invention is based on the first aspect thereof, and provides a distance measurement apparatus wherein the signal processing means comprises an amplifier which includes filtering means for removing components from the received signal to generate the processing-resultant signal, the removed components having frequencies lower than the frequencies of components of the pseudo random noise code signal.

A sixth aspect of this invention provides a distance measurement apparatus comprising first means for repetitively generating a pseudo random noise code signal of a predetermined chip length to generate a succession of the pseudo random noise code signals; second means for generating and emitting a forward light beam in response to the succession of the pseudo random noise code signals generated by the first means; third means for converting incident light into a corresponding voltage signal, the incident light including an echo light beam caused by reflection of the forward light beam at an object; a comparator for comparing the voltage signal generated by the third means with a preset decision reference voltage to convert the voltage signal into a corresponding binary signal; a correlator for calculating a correlation between the binary signal generated by the comparator and the pseudo random noise code signal generated by the first means; and fourth means for inhibiting the correlator from responding to the binary signal during a specified time which follows a moment of start of the repetitive generation of the pseudo random noise code signal by the first means, and which covers a time taken by the voltage signal to stabilize in direct-current voltage level.

A seventh aspect of this invention provides a distance measurement apparatus comprising first means for repetitively generating a pseudo random noise code signal of a predetermined chip length to generate a succession of the pseudo random noise code signals; second means for generating and emitting a forward light beam in response to the succession of the pseudo random noise code signals generated by the first means; third means for converting incident light into a corresponding voltage signal, the incident light including an echo light beam caused by reflection of the forward light beam at an object; a high pass filter for subjecting the voltage signal generated by the third means to a high pass filtering process to convert the voltage signal into a filtering-resultant signal; a comparator for comparing the filtering-resultant signal generated by the high pass filter with a preset decision reference voltage to convert the filtering-resultant signal into a corresponding binary signal; and a correlator for calculating a correlation between the binary signal generated by the comparator and the pseudo random noise code signal generated by the first means.

An eighth aspect of this invention is based on the seventh aspect thereof, and provides a distance measurement apparatus further comprising fourth means for inhibiting the correlator from responding to the binary signal during a specified time which follows a moment of start of the repetitive generation of the pseudo random noise code signal by the first means, and which covers a time taken by the voltage signal to stabilize in direct-current voltage level.

BRIEF DESCRIPTION OF THE DRAWINGS

FIG. 6 is a flowchart of a segment of a control program for a microcomputer in FIG. 5.

FIG. 7 is a time-domain diagram of a PN-code-signal transmission term, a delay time, one period of a PN-code signal, a stabilization time, a maximum round-trip time, and a sampling term.

DETAILED DESCRIPTION OF THE INVENTION

Figure 1:
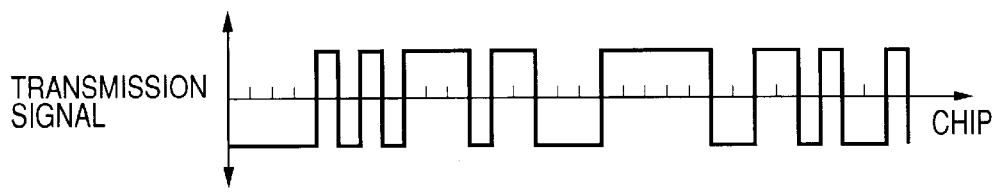
FIG. 1 is a time-domain diagram of a transmission signal.

Background-art distance measurement apparatuses will be explained below for a better understanding of this invention. A first background-art apparatus has a transmitter using a 31-chip maximum length code as a pseudo random noise code (a PN code). The first background-art apparatus generates a transmission signal in accordance with the 31-chip maximum length code. An example of the waveform of the transmission signal is shown in FIG. 1.

Figure 2:
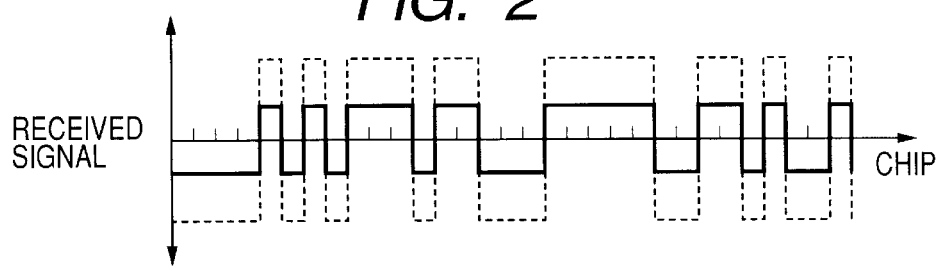
FIG. 2 is a time-domain diagram of a received signal which corresponds to the transmission signal in FIG. 1.

The waveform of a received signal (an echo signal) generated in the first background-art apparatus reflects the 31-chip maximum length code as shown in FIG. 2. The level of the received signal depends on various factors including the distance between the apparatus and a target object and the type of the target object. The first background-art apparatus is designed to receive an echo wave via an antenna. In this case, the level of the received signal varies between a positive side and a negative side of a reference potential as shown in FIG. 2. The reference potential is equal to, for example, a ground potential. The received signal can be accurately binarized by judging whether the level of the received signal is in the positive side or the negative side of the reference potential.

Figure 3:
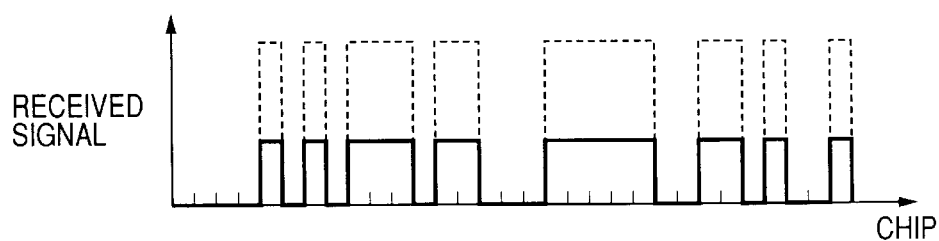
FIG. 3 is a time-domain diagram of another received signal which corresponds to the transmission signal in FIG. 1.

In a second background-art apparatus, a received signal (an echo signal) varies only in a positive side of a reference potential as shown in FIG. 3. Specifically, the received signal changes between a 0 potential (the reference potential) and a certain positive potential. The amplitude of the received signal, that is, the width of variations in the level of the received signal, depends on various factors including the distance between the apparatus and a target object and the type of the target object. In the second background-art apparatus, the received signal is binarized by comparing the level of the received signal with a fixed threshold voltage (a fixed decision reference voltage). Thus, the amplitude of the received signal is variable while the decision reference voltage is fixed. Accordingly, the received signal can not be accurately binarized when being in certain conditions. Inaccurately binarizing the received signal causes wrong recovery of a PN code and thus a reduction in accuracy of the calculated distance to a target object.

Figure 4:
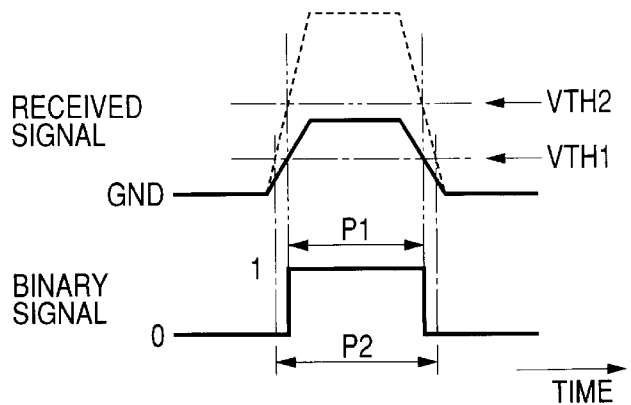
FIG. 4 is a time-domain diagram of a received signal and a corresponding binary signal which results from binarizing the received signal.

With reference to FIG. 4, the decision reference voltage in the second background-art apparatus is fixed to a given positive voltage VTH1 near a ground potential GND so that accurate distance measurements can be implemented when the amplitudes of received signals are relatively small. The pulse width of a binarizing-resultant signal which corresponds to a PN-code logic state of "1" depends on the amplitude of a received signal. Specifically, in FIG. 4, P1 denotes the pulse width of a binarizing-resultant signal which occurs when the amplitude of a received signal is relatively small, and P2 denotes the pulse width of a binarizing-resultant signal which occurs when the amplitude of a received signal is relatively great. The pulse width P1 is shorter than the pulse width P2. Accordingly, a received signal can not be accurately binarized when the amplitude thereof is relatively great. On the other hand, in the case where the decision reference voltage is fixed to a relatively-high positive voltage VTH2 so that accurate distance measurements can be implemented when the amplitudes of received signals are relatively great, received signals can not be accurately binarized when the amplitudes thereof are relatively small.

It should be noted that FIGS. 2 and 3 show ideal waveforms rather than actual waveforms which generally deform from rectangular shapes.

First Embodiment

Figure 5:
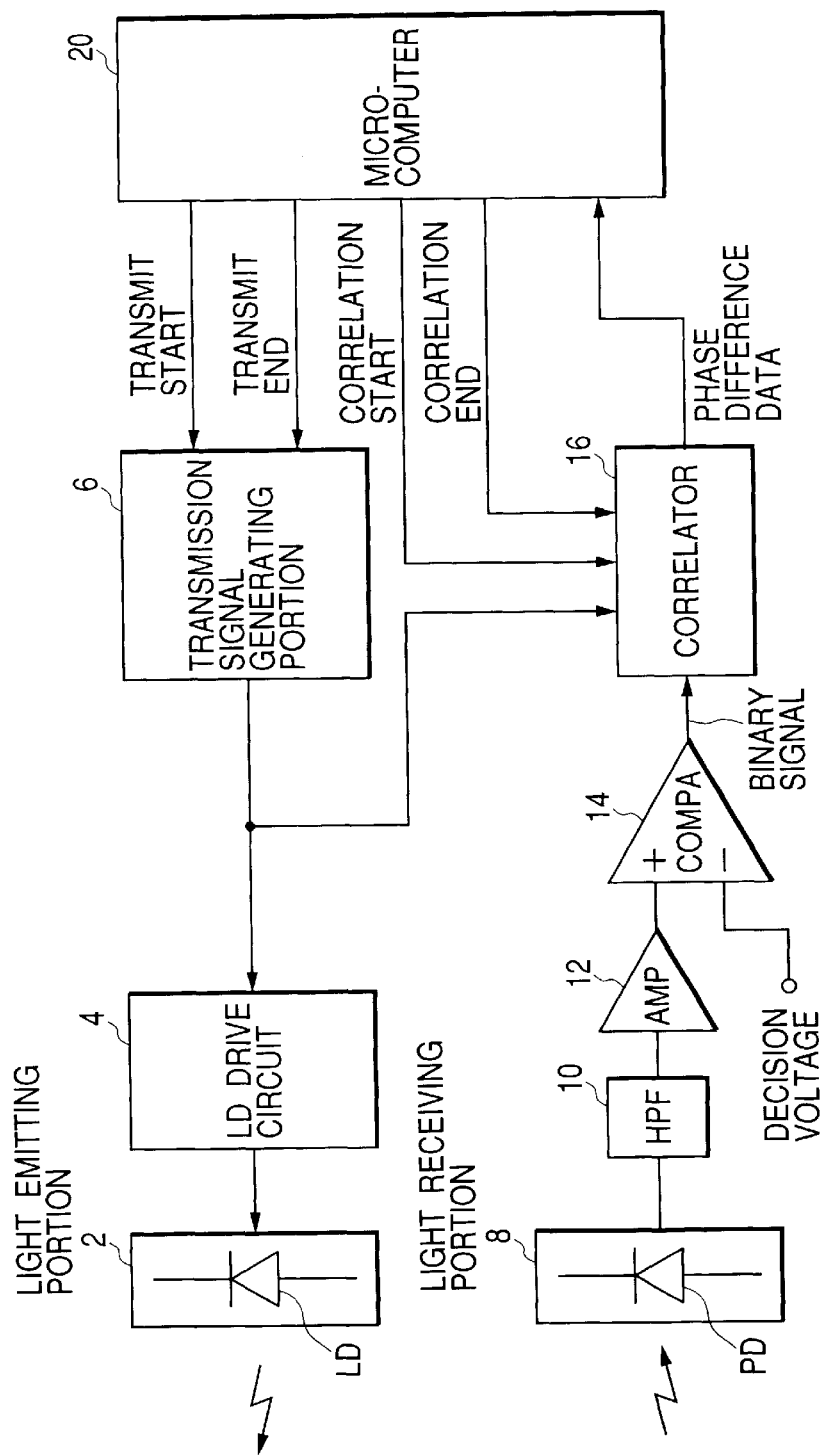
FIG. 5 is a block diagram of a distance measurement apparatus according to a first embodiment of this invention.

FIG. 5 shows a distance measurement apparatus according to a first embodiment of this invention. The apparatus of FIG. 5 is mounted on a vehicle (a subject vehicle). The apparatus of FIG. 5 measures the distance to an object from the subject vehicle. The object is, for example, an obstacle to the subject vehicle or a vehicle traveling ahead of the subject vehicle. The apparatus of FIG. 5 uses electromagnetic wave for distance measurement. The used electromagnetic wave is laser light.

The apparatus of FIG. 5 includes a light emitting portion 2. The light emitting portion 2 has a light emitting element using a laser diode LD. The laser diode LD can emit a forward laser beam as seen from the subject vehicle. A laser-diode drive circuit 4 selectively activates and deactivates the laser diode LD, thereby selectively allowing and inhibiting the emission (generation) of the forward laser beam therefrom.

The laser-diode drive circuit 4 receives a transmission signal from a transmission-signal generating portion 6. The transmission signal is of a binary form or a bi-level form, and has a train of pulses. The transmission signal is synchronous with an operation clock signal CK having a predetermined period. The operation clock signal CK has a fixed frequency equal to, for example, 20 MHz. The laser-diode drive circuit 4 activates and deactivates the laser diode LD in response to the transmission signal so that the laser diode LD emits pulse laser light. Specifically, when the transmission signal is in its high-level state (its logic state of "1"), the laser-diode drive circuit 4 activates the laser diode LD and hence the laser diode LD emits laser light. When the transmission signal is in its low-level state (its logic state of "0"), the laser-diode drive circuit 4 deactivates the laser diode LD so that the laser diode LD does not emit laser light. Accordingly, the forward laser beam emitted from the laser diode LD has a pulse train which results from amplitude modulation (intensity modulation) in accordance with the pulse train in the transmission signal.

The transmission-signal generating portion 6 starts repetitively generating a signal of a pseudo random noise code (a pseudo-noise code or a PN code) when receiving a transmission starting signal from a microcomputer 20. The transmission-signal generating portion 6 continues to repetitively generate the PN-code signal until receiving a transmission ending signal from the microcomputer 20. The transmission-signal generating portion 6 terminates the repetitive generation of the PN-code signal when receiving the transmission ending signal. The generated PN-code signal is composed of a sequence of a predetermined number of chips (bits). In other words, the PN-code signal has a predetermined chip length. The number of chips composing the PN-code signal is equal to, for example, 31. The PN-code signal is, for example, a signal of a maximum length code. The transmission signal generating portion 6 outputs the generated PN-code signal to the laser-diode drive circuit 4 as the transmission signal. The repetitive generation of the PN-code signal causes a succession of the same PN-code signals. In some cases, an end part of the succession is occupied by a former portion of the PN-code signal.

The light emitting portion 2 and the laser-diode drive circuit 4 correspond to a code generating means. The transmission-signal generating portion 6 corresponds to a transmitting means.

The apparatus of FIG. 1 includes a light receiving portion 8. The light receiving portion 8 has a light receiving element using a photodiode PD. The photodiode PD is connected via a current detection resistor to a power feed line in a reverse bias state. The light receiving portion 8 is successively followed by a high pass filter (HPF) 10, an amplifier 12, and a comparator 14.

In the case where an object exists in a specified forward area as seen from the subject vehicle, the forward laser beam encounters the object before being at least partially reflected thereby. A portion of the reflected laser beam returns to the apparatus of FIG. 1 as an echo laser beam. The photodiode PD and the other part of the light receiving portion 8 convert the echo laser beam into a corresponding electric signal (an echo signal). Specifically, a light-responsive current occurs when the echo laser beam is incident to the photodiode PD. The light-responsive current is converted into a voltage signal being the electric signal. The light receiving portion 8 outputs the electric signal to the high pass filter 10. The high pass filter 10 subjects the electric signal to a filtering process for removing direct-current and low-frequency signal components. The high pass filter 10 outputs the filtering-resultant signal to the amplifier 12. The device 12 amplifies the output signal of the high pass filter 10. The amplifier 12 outputs the amplification-resultant signal to the comparator 14. The amplification-resultant signal fed to the comparator 14 is also referred to as the received signal.

The high pass filter 10 and the amplifier 12 correspond to a signal processing means. The high pass filter 10 also corresponds to a filtering means.

The comparator 14 acts to binarize the output signal of the amplifier 12. Specifically, the device 14 compares the output signal of the amplifier 12 with a predetermined decision reference voltage (a predetermined threshold voltage), thereby converting the output signal of the amplifier 12 into a binary detection signal or a bi-level detection signal. The binary detection signal is in its high-level state when the voltage of the output signal of the amplifier 12 exceeds the predetermined decision reference voltage. Otherwise, the binary detection signal is in its low-level state. In general, the predetermined decision reference voltage is equal to a ground potential (a 0 potential). The comparator 14 corresponds to a binarizing means.

A correlator 16 receives the binary detection signal from the comparator 14. The correlator 16 receives the transmission signal from the transmission-signal generating portion 6. The correlator 16 includes a register or a memory which stores the transmission signal being the PN-code signal of the predetermined chip length. The correlator 16 uses the stored transmission signal as a reference code signal of the predetermined chip length. The correlator 16 calculates a correlation between the binary detection signal and the reference code signal. The correlator 16 corresponds to a correlation calculating means. The correlator 16 generates data of a phase difference between the binary detection signal and the reference code signal which corresponds to the moment of the occurrence of a peak of the calculated correlation. The correlation-peak-occurrence moment can be used as a moment at which the light receiving portion 8 (the photodiode PD) receives an echo laser beam caused by reflection of a forward laser beam at an object. The correlator 16 outputs the phase-difference data to the microcomputer 20.

Specifically, the correlator 16 can periodically sample the binary detection signal in synchronism with the operation clock signal CK and hold every resultant sampled bit of the binary detection signal. The correlator 16 starts the sampling of the binary detection signal and the holding of every resultant sampled bit thereof in response to a correlation starting signal outputted from the microcomputer 20. The correlator 16 terminates the sampling of the binary detection signal and the holding of every resultant sampled bit thereof in response to a correlation ending signal outputted from the microcomputer 20. The time interval between the moment of the occurrence of the correlation starting signal and the moment of the occurrence of the correlation ending signal corresponds to the duration of the PN-code signal of the predetermined chip length. Accordingly, the total number of the held sampled bits of the binary detection signal is equal to the total number of bits composing the reference code signal (the PN-code signal of the predetermined chip length). The correlator 16 iteratively calculates the correlation between the sampled bits of the binary detection signal and the bits of the reference code signal while the sampled bits are shifted one by one relative to the reference code signal. The correlator 16 detects a moment at which the calculated correlation peaks. The correlator 16 generates data of a phase difference between the set of the sampled bits of the binary detection signal and the set of the bits of the reference code signal which corresponds to the detected correlation-peak-occurrence moment. The correlator 16 outputs the phase-difference data to the microcomputer 20.

The microcomputer 20 includes a combination of an input/output circuit, a CPU, a ROM, and a RAM. The microcomputer 20 operates in accordance with a control program stored in the ROM. The control program is designed to enable the microcomputer 20 to execute operation steps mentioned later.

The microcomputer 20 calculates the time interval between the moment of the transmission of a forward laser beam by the light emitting portion 2 and the moment of the reception of a corresponding echo laser beam by the light receiving portion 8 on the basis of the phase-difference data outputted from the correlator 16. The calculated time interval is substantially equal to a time interval taken by the laser light to travel the distance to an object in forward and backward directions. The device 20 computes, from the calculated time interval, the distance between the subject vehicle and the object reflecting the forward laser beam and causing the echo laser beam. Specifically, the microcomputer 20 holds information representing the moment at which the transmission starting signal is outputted to the transmission-signal generating portion 6. The microcomputer 20 calculates, from the transmission-starting-signal outputting moment and the correlation-peak-occurrence moment represented by the phase-difference data, the time interval between the moment of the transmission of a forward laser beam by the light emitting portion 2 and the moment of the reception of a corresponding echo laser beam by the light receiving portion 8. The device 20 computes, from the calculated time interval, the distance between the subject vehicle and the object reflecting the forward laser beam and causing the echo laser beam.

As previously mentioned, the microcomputer 20 operates in accordance with a control program stored in its internal ROM. FIG. 6 is a flowchart of a segment of the control program which is iteratively executed. As shown in FIG. 6, a first step S110 of the program segment outputs a transmission starting signal to the transmission-signal generating portion 6. The transmission-signal generating portion 6 starts repetitively generating the PN-code signal of the predetermined chip length in response to the transmission starting signal. The repetitive generation of the PN-code signal causes a succession of the PN-code signals. The transmission-signal generating portion 6 outputs the succession of the PN-code signals to the laser-diode drive circuit 4 as the transmission signal. The laser-diode drive circuit 4 activates and deactivates the laser diode LD in response to the transmission signal so that the laser diode LD emits a forward laser beam which depends on the succession of the PN-code signals. After the step S110, the program advances to a step S120.

The step S120 determines whether or not a preset delay time has elapsed from the moment of outputting the transmission starting signal to the transmission-signal generating portion 6. When the preset delay time has elapsed, the program advances from the step S120 to a step S130. Otherwise, the step S120 is repeated.

The step S130 outputs a correlation starting signal to the correlator 16. The correlator 16 starts the sampling of the binary detection signal (the output signal from the comparator 14) and the holding of every resultant sampled bit thereof in response to the correlation starting signal. The sampling of the binary detection signal (the output signal from the comparator 14) and the holding of every resultant sampled bit thereof are synchronous with the operation clock signal CK. After the step S130, the program advances to a step S140.

The step S140 determines whether or not a prescribed time has elapsed from the moment of outputting the correlation starting signal to the correlator 16. When the prescribed time has elapsed, the program advances from the step S140 to a step S150. Otherwise, the step S140 is repeated. The prescribed time is equal to the duration of the PN-code signal of the predetermined chip length. The prescribed time is referred to as the sampling term or the period of the PN-code signal of the predetermined chip length.

The step S150 outputs a transmission ending signal to the transmission-signal generating portion 6. The transmission-signal generating portion 6 terminates the repetitive generation of the PN-code signal of the predetermined chip length in response to the transmission ending signal. Also, the step S150 outputs a correlation ending signal to the correlator 16. The correlator 16 terminates the sampling of the binary detection signal and the holding of every resultant sampled bit thereof in response to the correlation ending signal.

The time interval between the moment of outputting the correlation starting signal to the correlator 16 and the moment of outputting the correlation ending signal thereto is equal to the duration of the PN-code signal of the predetermined chip length. Accordingly, in the correlator 16, the total number of the held sampled bits of the binary detection signal is equal to the total number of bits composing the reference code signal (the PN-code signal of the predetermined chip length). The correlator 16 iteratively calculates the correlation between the sampled bits of the binary detection signal and the bits of the reference code signal while shifting the sampled bits relative to the reference code signal on a one-by-one basis. The correlator 16 detects a moment at which the calculated correlation peaks. The correlator 16 generates data of a phase difference between the set of the sampled bits of the binary detection signal and the set of the bits of the reference code signal which corresponds to the detected correlation-peak-occurrence moment. The correlator 16 outputs the phase-difference data to the microcomputer 20.

A step S160 following the step S150 calculates the time interval between the moment of the transmission of a forward laser beam by the light emitting portion 2 and the moment of the reception of a corresponding echo laser beam by the light receiving portion 8 on the basis of the phase-difference data outputted from the correlator 16. The calculated time interval is substantially equal to a time interval taken by the laser light to travel the distance to an object in forward and backward directions. The step S160 computes, from the calculated time interval, the distance between the subject vehicle and the object reflecting the forward laser beam and causing the echo laser beam. After the step S160, the current execution cycle of the program segment ends.

As shown in FIG. 7, the preset delay time between the moment of outputting a transmission starting signal to the transmission-signal generating portion 6 and the moment of outputting a correlation starting signal to the correlator 16 is equal to a stabilization time plus a maximum round-trip time. The stabilization time is between the moment of outputting a transmission starting signal to the transmission-signal generating portion 6 and the moment at which the direct-current voltage level of the received signal fed to the comparator 14 from the amplifier 12 becomes sufficiently stable. The stabilization time is equal to, for example, 1.5 $\mu$sec. The maximum round-trip time immediately follows the stabilization time. The maximum round-trip time is defined as a time interval taken by the laser light to travel the maximum measurable distance (for example, 200 m) to an object in forward and backward directions. The maximum round-trip time is equal to, for example, 1.33 $\mu$sec. Accordingly, the preset delay time is equal to, for example, 2.83 $\mu$sec. The preset delay time is immediately followed by the sampling term. The sampling term is equal to, for example, 1.55 $\mu$sec. The preset delay time and the sampling term compose a transmission term during which the PN-code signal of the predetermined chip length is repetitively outputted from the transmission-signal generating portion 6 to the laser-diode drive circuit 4. Thus, during the transmission term, a succession of the same PN-code signals each of the predetermined chip length is outputted.

Figure 8:
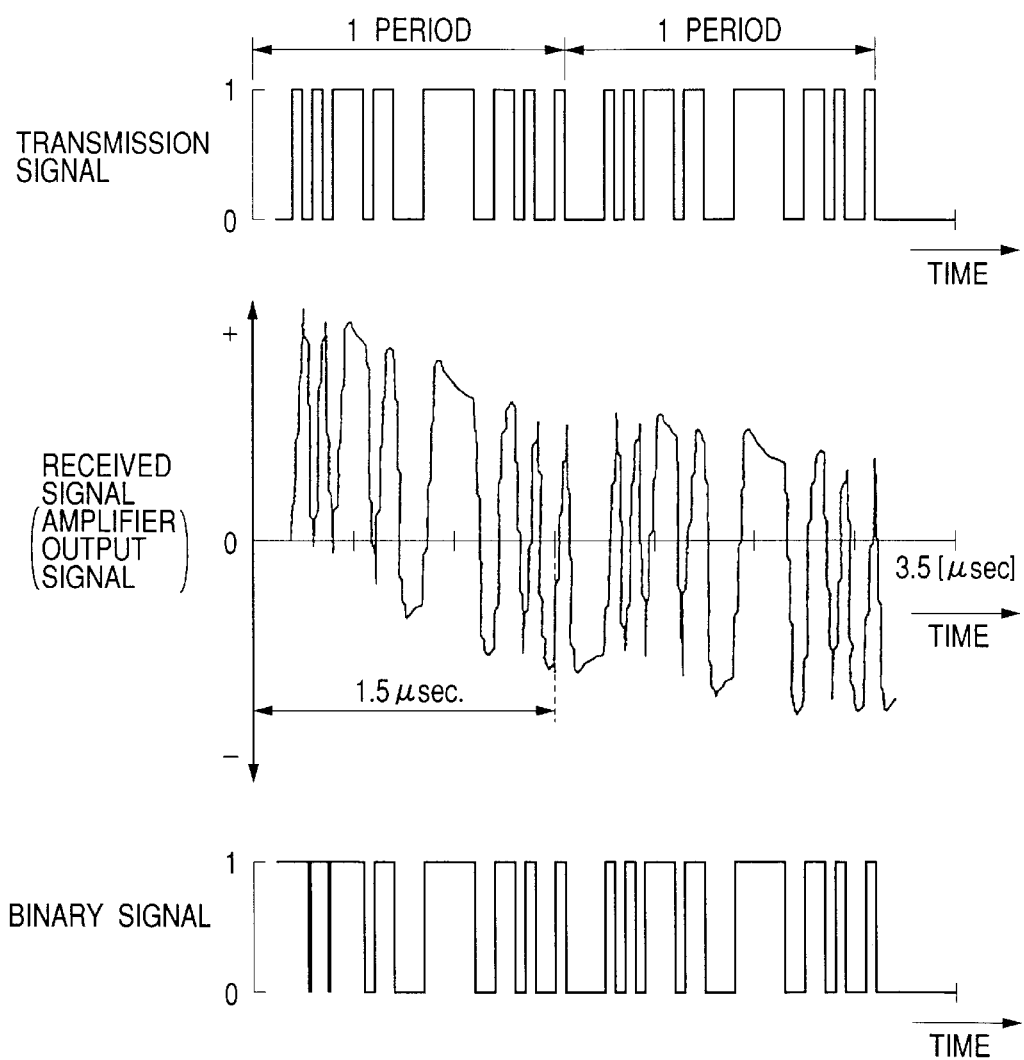
FIG. 8 is a time-domain diagram of a transmission signal, a received signal, and a binary signal resulting from binarizing the received signal in the apparatus of FIG. 5.

In exemplary operation of the apparatus of FIG. 5, the transmission-signal generating portion 6 generates a 31-chip signal of a maximum length code (a PN code) twice or more in succession in synchronism with a 20-MHz operation clock signal CK. The transmission-signal generating portion 6 outputs the succession of the two or more 31-chip maximum length code signals to the laser-diode drive circuit 4 as a transmission signal. The transmission signal has a duration corresponding to two or more periods of the 31-chip maximum length code signal as shown in FIG. 8. The laser-diode drive circuit 4 controls the light emitting portion 2 in response to the transmission signal. The light emitting portion 2 emits a forward laser beam which depends on the transmission signal. In the case where the emitted laser beam is directly incident to the light receiving portion 8, that is, in the case where the distance to an object is zero, the received signal fed to the comparator 14 from the amplifier 12 takes a waveform such as shown in FIG. 8. The binary detection signal outputted from the comparator 14 takes a waveform such as shown in FIG. 8.

The high pass filter 10 for removing direct-current and low-frequency signal components is interposed in the received-signal propagation path extending from the light receiving portion 8 to the comparator 14. As shown in FIG. 8, during an initial stage of the incidence of the laser beam to the light receiving portion 8, the center level, that is, the direct-current voltage level, of the received signal fed to the comparator 14 greatly deviates from the predetermined decision reference voltage (the ground potential or the 0 potential) in a positive-going direction. The intensity or amplitude of the incident laser beam is modulated in accordance with the PN-code signal. Therefore, during the initial stage of the incidence of the laser beam to the light receiving portion 8, the received signal fed to the comparator 14 swings substantially from the 0 potential to a certain positive potential determined by the intensity of the laser beam.

During the incidence of the laser beam to the light receiving portion 8, the center level (that is, the direct-current voltage level) of the received signal fed to the comparator 14 gradually drops toward the ground potential in accordance with the lapse of time. After the previously-mentioned initial stage, the center level of the received signal reaches the ground potential and then continues to stabilize thereat. Specifically, when 1.5 μsec have elapsed from the beginning of the incidence of the laser beam to the light receiving portion 8, the center level of the received signal starts stabilizing at the ground potential. Accordingly, under the condition that the center level of the received signal remains stabilizing at the ground potential, the comparator 14 which uses the ground potential as the predetermined decision reference voltage can accurately recover the PN-code signal as the binary detection signal.

The duration of the previously-mentioned initial stage of the incidence of the laser beam to the light receiving portion 8 is also referred to as the stabilization time (for example, 1.5 μsec). As previously mentioned, during the preset delay time and the subsequent sampling term, the laser beam repetitively accorded with the PN-code signal is emitted. The preset delay time is between the moment of outputting a transmission starting signal to the transmission-signal generating portion 6 and the moment of outputting a correlation starting signal to the correlator 16. Preferably, the preset delay time is equal to or longer than the stabilization time. More preferably, the preset delay time is equal to the stabilization time plus the maximum round-trip time (see FIG. 7). After the stabilization time, the comparator 14 can accurately recover the PN-code signal as the binary detection signal.

As previously mentioned, the high pass filter 10 acts to remove direct-current and low-frequency signal components. The high pass filter 10 has a preset cutoff frequency. Specifically, the cutoff frequency of the high pass filter 10 is lower than the lowest of the frequencies of components of the PN-code signal. Preferably, the cutoff frequency of the high pass filter 10 is equal to a relatively low value.

In the 31-chip maximum length code, the greatest number of successive bits of "1" is equal to 5, and also the greatest number of successive bits of "0" is equal to 5. Thus, in the case where the PN-code signal uses the 31-chip maximum length code signal and the operation clock signal CK has a frequency of 20 MHz, the lowest of the frequencies of components of the PN-code signal is equal to 2 MHz. In this case, the cutoff frequency of the high pass filter 10 is set lower than 20 MHz. To surely prevent the received signal from being adversely affected by the high pass filter 10, the cutoff frequency of the high pass filter 10 is set to about 100 kHz.

Figure 9:
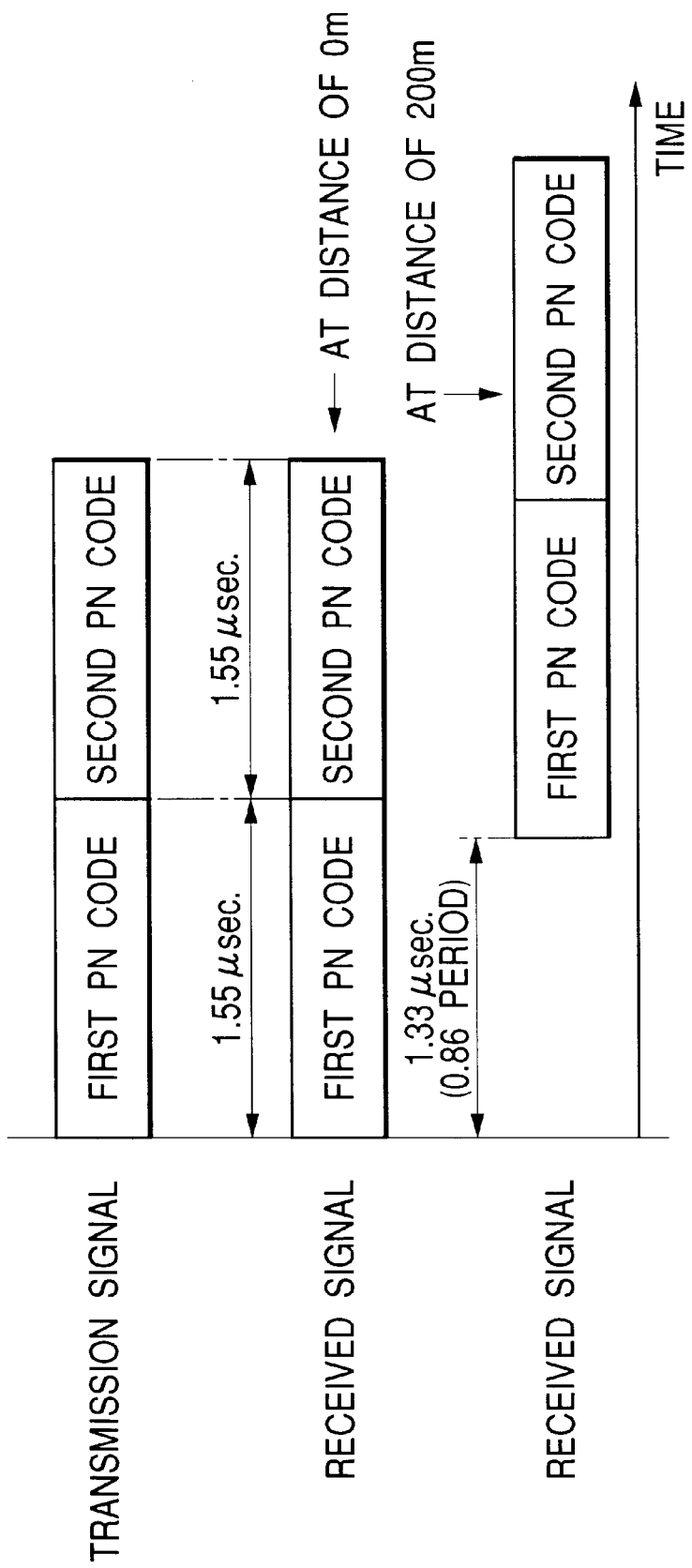
FIG. 9 is a time-domain diagram of a transmission signal, a received signal, and another received signal in the apparatus of FIG. 5.

As previously mentioned, the preset delay time is between the moment of outputting a transmission starting signal to the transmission-signal generating portion 6 and the moment of outputting a correlation starting signal to the correlator 16. The preset delay time is equal to the stabilization time plus the maximum round-trip time (see FIG. 7). The stabilization time is equal to, for example, 1.5 μsec. The maximum round-trip time is equal to, for example, 1.33 μsec. The preset delay time is equal to, for example, 2.83 μsec. In the case where an object is at the zero distance from the present apparatus and the received signal (the output signal of the light receiving portion 8) corresponds to an echo laser beam caused by the reflection of a forward laser beam at the object, there is no delay between the received signal and a corresponding transmission signal as shown in FIG. 9. On the other hand, in the case where an object is at the maximum measurable distance (for example, 200 m) from the present apparatus and the received signal corresponds to an echo laser beam caused by the reflection of a forward laser beam at the object, the received signal delays from a corresponding transmission signal by the maximum round-trip time (1.33 μsec) as shown in FIG. 9. Since the preset delay time is equal to the stabilization time plus the maximum round-trip time, it is possible to accurately measure the distance to an object which is in the range of 0 to 200 m. The preset delay time may be greater than the stabilization time plus the maximum round-trip time.

The preset delay time being equal to the stabilization time plus the maximum round-trip time enables the correlator 16 to respond to the binary detection signal purely corresponding to an echo laser beam from an object. Thus, the correlation calculated by the correlator 16 can be an accurate indication of the distance to an object. During the preset delay time, the correlator 16 remains inhibited from sampling the output signal of the comparator 14. Thereafter, the correlator 16 continues to periodically sample the output signal of the comparator 14 only during a time interval equal to the duration of the PN-code signal of the predetermined chip length. Thus, the corresponding limited number of the resultant sampled bits of the output signal of the comparator 14 are used in calculating the correlation with the reference code signal. Accordingly, the calculation of the correlation by the correlator 16 can be simplified. Furthermore, the structure of the correlator 16 can be simplified.

The steps S110–S130 in FIG. 6 correspond to a transmission start timing controlling means. The step S160 in FIG. 6 corresponds to a distance calculating means. The steps S140 and S150 enables the correlator 16 to function as a correlation calculating means.

Second Embodiment

A second embodiment of this invention is similar to the first embodiment thereof except that the high pass filter 10 is omitted and the amplifier 12 is modified as follows. In the second embodiment of this invention, the amplifier 12 has two or more amplification stages connected in cascade via a coupling capacitor or capacitors functioning to cut off direct-current and low-frequency signal components.

Third Embodiment

A third embodiment of this invention is similar to the first embodiment thereof except that the preset delay time is equal to the stabilization time.

Fourth Embodiment

A fourth embodiment of this invention is similar to the first embodiment thereof except that the laser light is replaced by other electromagnetic wave such as radio wave or millimeter wave. A distance measurement apparatus in the fourth embodiment of this invention includes a means for receiving echo electromagnetic wave and converting the received echo electromagnetic wave into a corresponding electric voltage signal which varies only in a positive side or a negative side of a reference potential.

Fifth Embodiment

A fifth embodiment of this invention is similar to the first embodiment thereof except for design changes mentioned below. A distance measurement apparatus in the fifth embodiment of this invention uses millimeter wave as distance-measuring electromagnetic wave. The apparatus includes a resonant antenna for capturing echo millimeter wave to induce a corresponding received signal. One end of the antenna is grounded and subjected to a reference potential. Thus, the level of the received signal varies only in a positive side or a negative side of the reference potential.

What is claimed is:

1. A distance measurement apparatus comprising:

code generating means for repetitively generating a pseudo random noise code signal of a predetermined chip length in synchronism with a clock signal of a fixed period to generate a succession of the pseudo random noise code signals;

transmitting means for generating a distance-measuring electromagnetic wave in accordance with the succession of the pseudo random noise code signals generated by the code generating means, and for transmitting the generated electromagnetic wave toward an object as a forward electromagnetic wave;

receiving means for receiving an echo electromagnetic wave caused by reflection of the forward electromagnetic wave at the object, and for converting the received echo electromagnetic wave into a corresponding received signal which varies only in one of (1) a positive side and (2) a negative side of a reference potential;

signal processing means for removing components from the received signal generated by the receiving means to generate a processing-resultant signal, the removed components having frequencies lower than frequencies of components of the pseudo random noise code signal generated by the code generating means;

binarizing means for comparing the processing-resultant signal generated by the signal processing means with a preset decision reference voltage to convert the filtering-resultant signal into a corresponding binary signal;

correlation value calculating means for sampling the binary signal generated by the binarizing means into received data in synchronism with the clock signal, and for calculating a value of a correlation between the received data and the pseudo random noise code signal generated by the code generating means;

distance calculating means for calculating a time interval taken by the electromagnetic wave to travel a distance to the object in forward and backward directions on the basis of the correlation value calculated by the correlation value calculating means, and for computing the distance to the object from the calculated time interval; and transmission start timing controlling means for, before start of the sampling by the correlation value calculating means, causing the code generating means to repetitively generate the pseudo random noise code signal during a surplus time corresponding to at least a stabilization time taken by the received signal to stabilize in direct-current voltage level after start of reception of the echo electromagnetic wave by the receiving means, and thereby for causing a timing of start of transmission of the forward electromagnetic wave by the transmitting means to be earlier than a timing of start of calculation of the correlation value by the correlation value calculating means.

2. A distance measurement apparatus as recited in claim 1, wherein the transmission start timing controlling means comprises means for, before start of the sampling by the correlation value calculating means, causing the code generating means to repetitively generate the pseudo random noise code signal during the surplus time equal to the stabilization time plus a maximum round-trip time taken by electromagnetic wave to travel a maximum measurable distance in forward and backward directions.

3. A distance measurement apparatus as recited in claim 1, wherein the correlation value calculating means comprises (1) means for periodically sampling the binary signal to generate received data sampled bits whose number corresponds to the predetermined chip length, and (2) means for calculating the value of the correlation between the received data sampled bits and the bits of the pseudo random noise code signal while shifting the received data sampled bits relative to the pseudo random noise code on a 1-bit by 1-bit basis, and wherein the distance calculating means comprises means for calculating the time interval taken by the electromagnetic wave to travel the distance to the object in the forward and backward directions on the basis of a phase difference between the received data sampled bits and the bits of the pseudo random noise code signal which corresponds to a moment when the correlation value calculated by the correlation value calculating means peaks.

4. A distance measurement apparatus as recited in claim 1, wherein the transmitting means comprises (1) a light emitting element for generating light as the distance-measuring electromagnetic wave and (2) a drive circuit for driving the light emitting element in accordance with the pseudo random noise code signal, and the receiving means comprises a light receiving element for receiving the echo electromagnetic wave caused by reflection of the forward electromagnetic wave at the object.

5. A distance measurement apparatus as recited in claim 1, wherein the signal processing means comprises an amplifier which includes filtering means for removing components from the received signal to generate the processing-resultant signal, the removed components having frequencies lower than the frequencies of components of the pseudo random noise code signal.

6. A distance measurement apparatus comprising:

first means for repetitively generating a pseudo random noise code signal of a predetermined chip length to generate a succession of the pseudo random noise code signals;

second means for generating and emitting a forward light beam in response to the succession of the pseudo random noise code signals generated by the first means;

third means for converting incident light into a corresponding voltage signal, the incident light including an echo light beam caused by reflection of the forward light beam at an object;

a comparator for comparing the voltage signal generated by the third means with a preset decision reference voltage to convert the voltage signal into a corresponding binary signal;

a correlator for calculating a correlation between the binary signal generated by the comparator and the pseudo random noise code signal generated by the first means; and fourth means for inhibiting the correlator from responding to the binary signal during a specified time which follows a moment of start of the repetitive generation of the pseudo random noise code signal by the first means, and which covers a time taken by the voltage signal to stabilize in direct-current voltage level.

7. A distance measurement apparatus comprising:

first means for repetitively generating a pseudo random noise code signal of a predetermined chip length to generate a succession of the pseudo random noise code signals;

second means for generating and emitting a forward light beam in response to the succession of the pseudo random noise code signals generated by the first means;

third means for converting incident light into a corresponding voltage signal, the incident light including an echo light beam caused by reflection of the forward light beam at an object;

a high pass filter for subjecting the voltage signal generated by the third means to a high pass filtering process to convert the voltage signal into a filtering-resultant signal;

a comparator for comparing the filtering-resultant signal generated by the high pass filter with a preset decision reference voltage to convert the filtering-resultant signal into a corresponding binary signal; and a correlator for calculating a correlation between the binary signal generated by the comparator and the pseudo random noise code signal generated by the first means.

8. A distance measurement apparatus as recited in claim 7, further comprising fourth means for inhibiting the correlator from responding to the binary signal during a specified time which follows a moment of start of the repetitive generation of the pseudo random noise code signal by the first means, and which covers a time taken by the voltage signal to stabilize in direct-current voltage level.

* * * * *